United States Patent
Rimai (10) Patent No.: US 12,459,297 B2
(45) Date of Patent: Nov. 4, 2025

(54) NON-PNEUMATIC TIRE HAVING REINFORCED SUPPORT STRUCTURE AND METHOD OF MAKING SAME

(71) Applicant: Bridgestone Americas Tire Operations, LLC, Nashville, TN (US)

(72) Inventor: Benjamin E. Rimai, Copley, OH (US)

(73) Assignee: Bridgestone Americas Tire Operations, LCC, Nashville, TN (US)

( * ) Notice: Subject to any disclaimer, the term of this patent is extended or adjusted under 35 U.S.C. 154(b) by 723 days.

(21) Appl. No.: 17/783,350

(22) PCT Filed: Dec. 3, 2020

(86) PCT No.: PCT/US2020/063022
§ 371 (c)(1),
(2) Date: Jun. 8, 2022

(87) PCT Pub. No.: WO2021/137993
PCT Pub. Date: Jul. 8, 2021

(65) Prior Publication Data
US 2023/0009098 A1    Jan. 12, 2023

Related U.S. Application Data (60) Provisional application No. 62/954,731, filed on Dec. 30, 2019.

(51) Int. Cl.
*B60C 7/14* (2006.01)
*B60C 7/10* (2006.01)
*B60C 7/22* (2006.01)

(52) U.S. Cl.
CPC .............. *B60C 7/146* (2021.08); *B60C 7/107* (2021.08); *B60C 7/143* (2013.01); *B60C 7/22* (2013.01)

(58) Field of Classification Search
CPC ......... B60C 7/146; B60C 7/107; B60C 7/143; B60C 7/22
See application file for complete search history.

(56) References Cited

U.S. PATENT DOCUMENTS

2010/0200131 A1* 8/2010 Iwase .................. B60C 7/18
152/209.1
2010/0260967 A1* 10/2010 Delfino .................. B32B 5/12
428/113

(Continued)

FOREIGN PATENT DOCUMENTS

| CN | 106114066 | 11/2016 |
| CN | 205768329 | 12/2016 |

(Continued)

OTHER PUBLICATIONS

International Search Report & Written Opinion; Corresponding PCT Application Serial No. PCT/US2020/063022; Authorized Officer Commissioner; Mar. 15, 2021.

(Continued)

*Primary Examiner* — Kip T Kotter
(74) *Attorney, Agent, or Firm* — Shaun J. Fox; Bryan J. Jaketic (57) ABSTRACT

A method of making a non-pneumatic tire includes providing an inner ring of elastomeric material and an outer ring of elastomeric material, and arranging the inner ring and the outer ring such that the inner ring is substantially coaxial with the outer ring. The method further includes providing a plurality of sheets of reinforced elastomeric material and forming the plurality of sheets into a plurality of U-shaped sheets. The method also includes arranging the plurality of U-shaped sheets between the inner ring and the outer ring, and curing the inner ring, the outer ring, and the plurality of U-shaped sheets.

13 Claims, 11 Drawing Sheets

(56) References Cited

U.S. PATENT DOCUMENTS

| | | | |
|---|---|---|---|
| 2014/0000777 A1* | 1/2014 | Choi .................... | B60C 7/18 |
| | | | 152/246 |
| 2016/0214435 A1 | 7/2016 | Schaedler et al. | |
| 2017/0008342 A1* | 1/2017 | Martin .................. | B60C 7/22 |
| 2018/0001704 A1 | 1/2018 | Reinhardt | |
| 2018/0093528 A1 | 4/2018 | Schaedler et al. | |
| 2018/0272799 A1 | 9/2018 | Celik et al. | |
| 2018/0361792 A1 | 12/2018 | Manesh et al. | |
| 2019/0126684 A1 | 5/2019 | Celik et al. | |
| 2021/0122190 A1* | 4/2021 | Celik ................. | B60C 7/107 |
| 2021/0138836 A1* | 5/2021 | Abe .................... | B60C 7/20 |

FOREIGN PATENT DOCUMENTS

| | | |
|---|---|---|
| CN | 106476526 | 3/2017 |
| CN | 108068549 | 5/2018 |
| CN | 110091661 | 8/2019 |
| JP | 2015116870 | 6/2015 |
| JP | 2016113105 | 6/2016 |
| JP | 2016113106 | 6/2016 |
| KR | 10-2012-0063616 | 6/2012 |
| KR | 20190090455 | 8/2019 |

OTHER PUBLICATIONS

Supplementary European Search Report; Corresponding EP Application No. 20911232; Jan. 5, 2024.
European Search Report; Corresponding EP Application Serial No. 25156859; May 23, 2025.

* cited by examiner

NON-PNEUMATIC TIRE HAVING REINFORCED SUPPORT STRUCTURE AND METHOD OF MAKING SAME

FIELD OF INVENTION

The present disclosure relates to a non-pneumatic tire having reinforced support structure and a method of making the same. More particularly, the present disclosure relates to a non-pneumatic tire having reinforced spokes or webbing formed by U-shaped components and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

SUMMARY OF THE INVENTION

In one embodiment, a non-pneumatic tire includes an inner ring having a first diameter and an outer ring having a second diameter greater than the first diameter. The outer ring is substantially coaxial with the inner ring. The non-pneumatic tire further includes support structure extending between the inner ring and the outer ring. The support structure includes a plurality of U-shaped components extending laterally from a first side of the non-pneumatic tire to second side of the non-pneumatic tire. Each of the plurality of U-shaped components defines an opening that is visible from the first side of the non-pneumatic tire. Each of the plurality of U-shaped components is in direct contact with both the inner ring and the outer ring. The plurality of U-shaped components includes at least a first U-shaped component and a second U-shaped component in direct contact with the first U-shaped component. The non-pneumatic tire further includes a plurality of fillets disposed between the inner ring and the outer ring. The plurality of fillets includes at least a first fillet and a second fillet. The first fillet is in direct contact with the inner ring, the first U-shaped component, and the second U-shaped component. The second fillet is in direct contact with the outer ring, the first U-shaped component, and the second U-shaped component.

In another embodiment, a method of making a non-pneumatic tire includes providing an inner ring of elastomeric material and an outer ring of elastomeric material, and arranging the inner ring and the outer ring such that the inner ring is substantially coaxial with the outer ring. The method further includes providing a plurality of sheets of reinforced elastomeric material and forming the plurality of sheets into a plurality of U-shaped sheets. The method also includes arranging the plurality of U-shaped sheets between the inner ring and the outer ring, and curing the inner ring, the outer ring, and the plurality of U-shaped sheets.

In yet another embodiment, a non-pneumatic tire includes an inner ring, an outer ring, and a plurality of U-shaped components extending between the inner ring and the outer ring. The plurality of U-shaped components includes at least a first U-shaped component and a second U-shaped component. The first U-shaped component is in direct contact with both the inner ring and the outer ring, and has a single reinforcement layer disposed therein. The first U-shaped component includes a first extent that extends between the inner ring and the outer ring and a second extent that extends between the inner ring and the outer ring. The second U-shaped component is also in direct contact with both the inner ring and the outer ring, and has a single reinforcement layer disposed therein. The second U-shaped component includes a third extent that extends between the inner ring and the outer ring and a fourth extent that extends between the inner ring and the outer ring. The second extent is in direct contact with the third extent.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
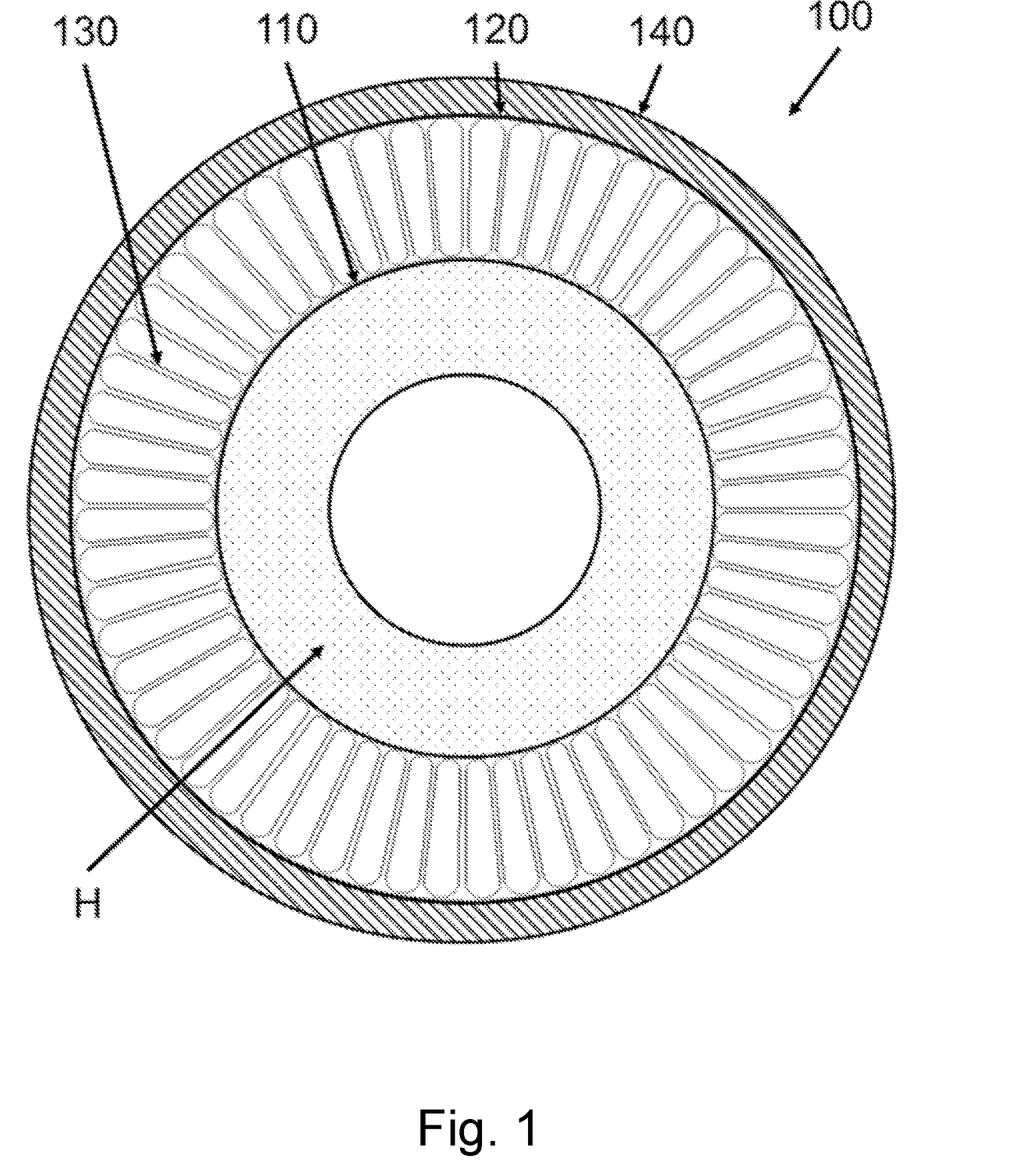
FIG. 1 is a front view of one embodiment of a non-pneumatic tire.

FIG. 1 is a front view of one embodiment of a non-pneumatic tire 100. The non-pneumatic tire 100 includes an inner ring 110 having a first diameter, and an outer ring 120 having a second diameter greater than the first diameter. The outer ring 120 is substantially coaxial with the inner ring 110. In the illustrated embodiment, the inner ring 110 is shown as being attached to a hub H. A plurality of spokes 130 extend between the inner ring 110 and the outer ring 120. In an alternative embodiment, a webbing or other support structure may be employed instead of spokes.

A circumferential tread 140 is disposed about the outer ring 120 in the illustrated embodiment. The tread 140 may include tread elements such as grooves, ribs, blocks, lugs, sipes, studs, and other elements. A shear band or other shear element or reinforcement structure (not shown) may be disposed between the outer ring 120 and the tread 140. In an alternative embodiment (not shown), the separate tread may be omitted and instead tread elements may be formed directly on the outer ring.

Figure 2:
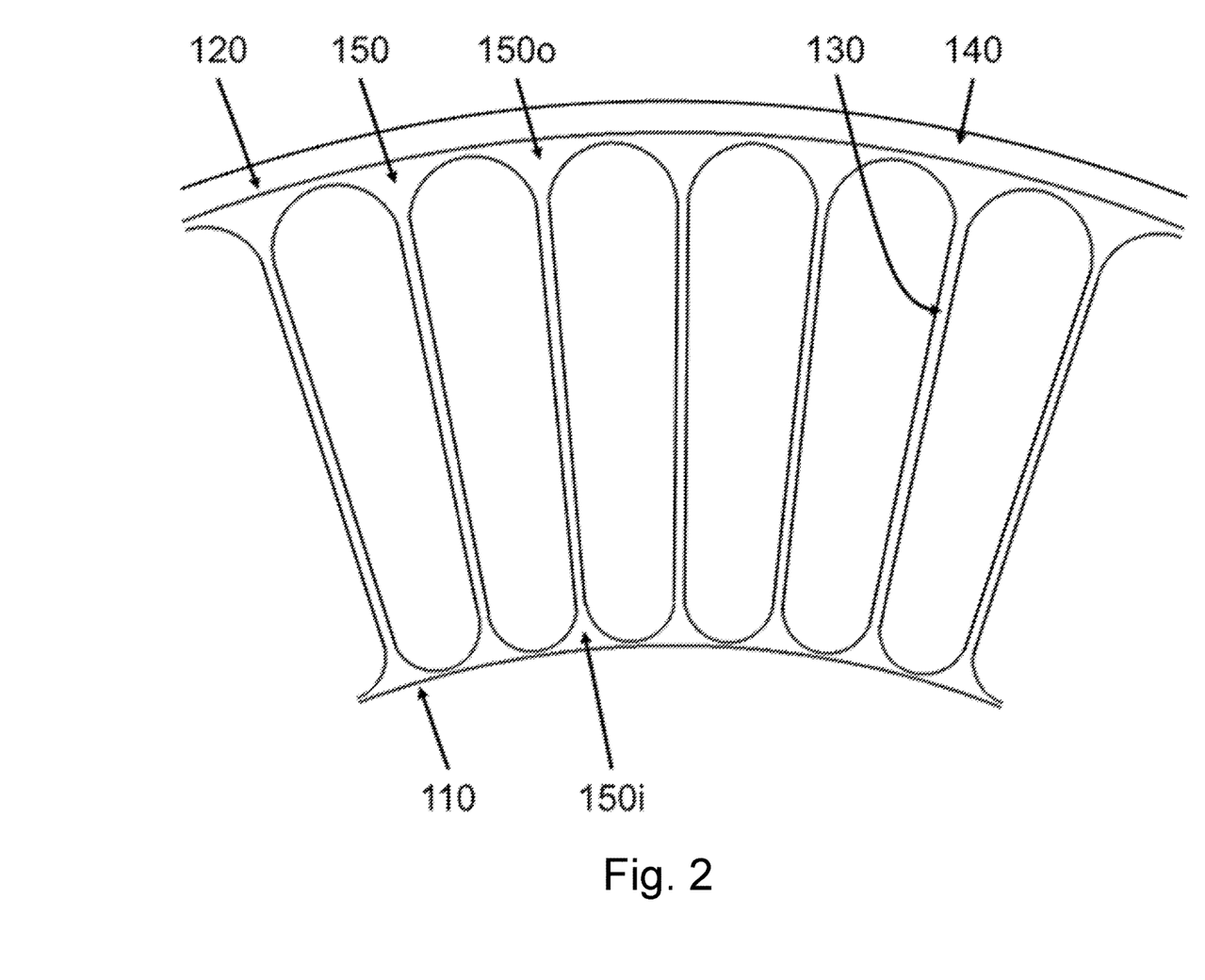
FIG. 2 is an enlarged partial front view of the non-pneumatic tire of FIG. 1.

FIG. 2 is an enlarged partial front view of the non-pneumatic tire of FIG. 1. As can be seen in this view, the spokes 130 are formed by a plurality of loops defined by U-shaped components and fillets 150 disposed in a series circumferentially about the tire. Each of the individual loops extends laterally from a first side of the non-pneumatic tire 100 to a second side of the non-pneumatic tire 100. Each of the plurality of loops defines an opening that is visible from the first side of the tire.

In the illustrated embodiment, each of the plurality of loops is in direct contact with both the inner ring 110 and the outer ring 120. The plurality of fillets 150 are also disposed between the inner ring 110 and the outer ring 120. The plurality of fillets 150 includes inner fillets 150*i* and outer fillets 150*o*. The inner fillets 150*i* are in direct contact with the inner ring 110, and both a first U-shaped component and a second U-shaped component in each adjacent pair of loops. The outer fillets 150*o* are in direct contact with the outer ring 120, and both the first U-shaped component and second U-shaped component in each adjacent pair of loops.

The inner and outer rings 110, 120 may be constructed of a polymeric material, such as natural or synthetic rubber, other elastomeric material. Alternatively, the inner and outer rings 110, 120 may be constructed of a harder polymeric material such as polyurethane, polyester, nylon and polyvinyl chloride (PVC). The spokes 130 are formed of U-shaped components constructed of elastomeric material having a single layer of reinforcement disposed therein. The U-shaped components may be constructed from a sheet of elastomeric material having a single layer of reinforcement disposed therein.

The reinforcement may be steel cords. Alternatively, the reinforcement may be formed by cords constructed of nylon, polyester, fiber glass, carbon fiber, aramid, glass, polyethylene (polyethylene terephthalate), or other reinforcement materials. In an alternative embodiment, the U-shaped components may be constructed of elastomeric material having two or more layers of reinforcements.

The tread 140 and the fillets 150 are both constructed of an elastomeric material, such as natural or synthetic rubber, other elastomeric material. The tread 140 and the fillets 150 may also be constructed of any polymeric material.

Figure 3:
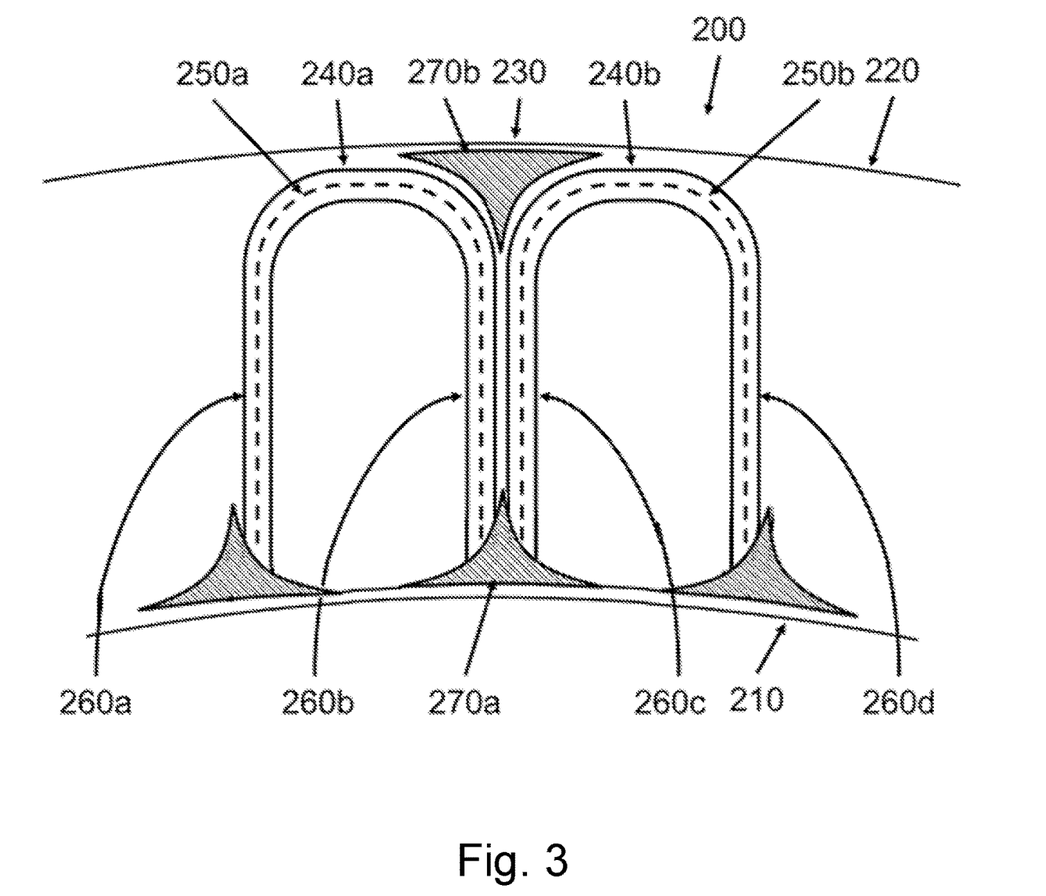
FIG. 3 is a schematic drawing illustrating a partial front view of a non-pneumatic tire during its construction.

Additional details of the U-shaped components may be seen in FIG. 3, which is a schematic drawing illustrating a partial front view of a non-pneumatic tire 200 during its construction. The non-pneumatic tire 200 includes an inner ring 210 having a first diameter, and an outer ring 220 having a second diameter greater than the first diameter. The outer ring 220 is substantially coaxial with the inner ring 210. As shown in this figure, a spoke 230 is being formed by a first U-shaped component 240*a* and a second U-shaped component 240*b*. The first U-shaped component includes a first layer of reinforcement cords 250*a* and the second U-shaped component includes a second layer of reinforcement cords 250*b*.

In the illustrated embodiment, each U-shaped component has a base adjacent to the outer ring 220 and a pair of substantially radial extents that extend towards the inner ring 210. Specifically, the first U-shaped component has a first substantially radial extent 260*a* and a second substantially radial extent 260*b*. The second U-shaped component has a third substantially radial extent 260*c* and a fourth substantially radial extent 260*d*. Thus, each of the U-shaped components has a reinforcement 250 that extends circumferentially along the outer ring 220 and radially along the extents 260, terminating at a location adjacent to the inner ring 210.

Additionally, a first fillet 270*a* is disposed between the first U-shaped component 240*a*, the second U-shaped component 240*b*, and the inner ring 210. A second fillet 270*b* is likewise disposed between the first U-shaped component 240*a*, the second U-shaped component 240*b*, and the outer ring 220.

At the stage shown in FIG. 3, the first U-shaped component 240*a* is spaced from the second U-shaped component 240*b*. This spacing may be exaggerated for illustrative purposes. During the process of forming the non-pneumatic tire, heat and pressure are applied during a curing process. Specifically, pressure is applied to the second extent 260*b* of the first U-shaped component 240*a* and to the third extent 260*c* of the second U-shaped component 240*b*, which causes the second extent 260*b* to contact the third extent 260*c*. As heat and pressure are applied, the second extent 260*b* bonds with the third extent 260*c*, such that the first U-shaped component 240*a* and the second U-shaped component 240*b* form a single spoke 230 having two layers of reinforcement cords formed by the first and second layer of reinforcement cords 250*a,b*. The resulting spoke 230 extends in a substantially radial direction, in the same manner as the spokes 130 of FIGS. 1 and 2.

In one embodiment, at least half of the second extent 260*b* is in contact with at least half of the third extent 260*c*. In an alternative embodiment, at least two-thirds of the second extent 260*b* is in contact with at least two-thirds of the third extent 260*c*.

In the illustrated embodiment, each of the first and second layers of reinforcement cords 250*a,b* extends in a substantially radial direction in the resulting spoke 130. In an alternative embodiment, one or both of the layers of reinforcement cords is biased with respect to the radial direction. In one such embodiment, one or both of the layers of reinforcement cords is biased at an angle between 50° and 90°.

In an alternative embodiment, the extents between the inner and outer ring are curved rather than linear. Curved extents may be used to control the direction and the magnitude of spoke buckling as the tire rotates. Such curved extents may still be considered substantially radial. In one such embodiment, the reinforcement cords may have the same curve as the extents. In an alternative embodiment, the reinforcement cords may have different curves from the extents. In another alternative embodiment, the reinforcement cords may extend linearly while the extents are curved.

In other alternative embodiments, the extents are substantially linear while one or more of the layers of reinforcement cords are curved with respect to radial direction. Curved layers of reinforcement cords may be used to control the direction and the magnitude of spoke buckling as the tire rotates. In such embodiments, the resulting spoke may still extend linearly when in an uncompressed state, even though one or more of the layers of reinforcement cords are curved. In such an arrangement, the spokes may be described as having a reinforcement pre-curvature.

Figure 4:
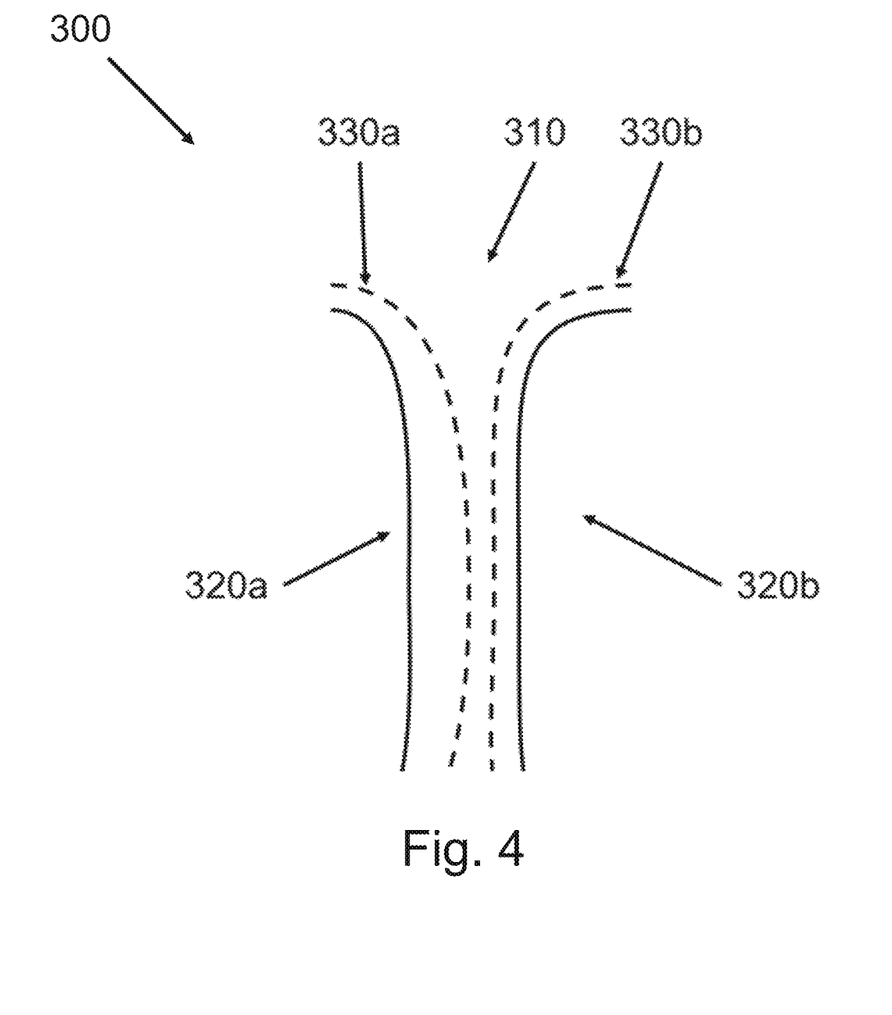
FIG. 4 is a schematic drawing illustrating a partial front view of an alternative embodiment of a spoke for a non-pneumatic tire.

FIG. 4 provides an example of a spoke having a reinforcement pre-curvature. FIG. 4 is a schematic drawing illustrating a partial front view of an alternative embodiment of a non-pneumatic tire 300. A spoke 310 is defined by a first U-shaped component 320*a* having a first layer of reinforcement cords 330*a* and a second U-shaped component 320*b* having a second layer of reinforcement cords 330*b*. The spoke 310 extends in a substantially radial direction. The second layer of reinforcement cords 330*b* also extends in a substantially radial direction along the length of the spoke 310, but the first layer of reinforcement cords 330*a* is curved inside of the spoke 310.

In the illustrated embodiment, the first layer of reinforcement cords 330*a* is curved while the second layer of reinforcement cords is substantially linear. In an alternative embodiment, both the first and second layers of reinforcement cords are curved.

Figure 5A:
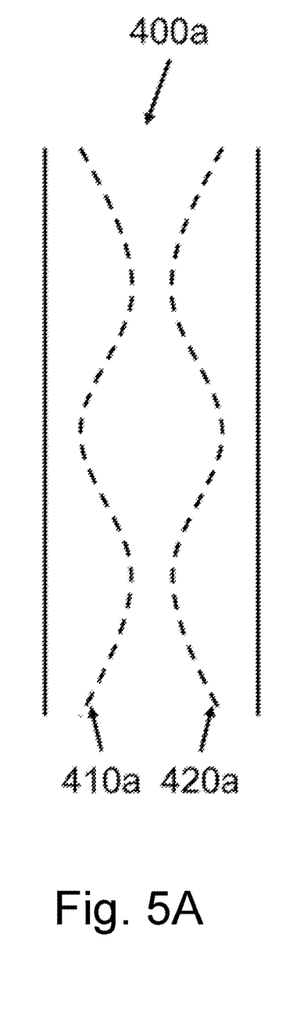
FIGS. 5A-5C are schematic drawings illustrating a partial front views of other alternative embodiments of spokes for non-pneumatic tires.
Figure 5B:
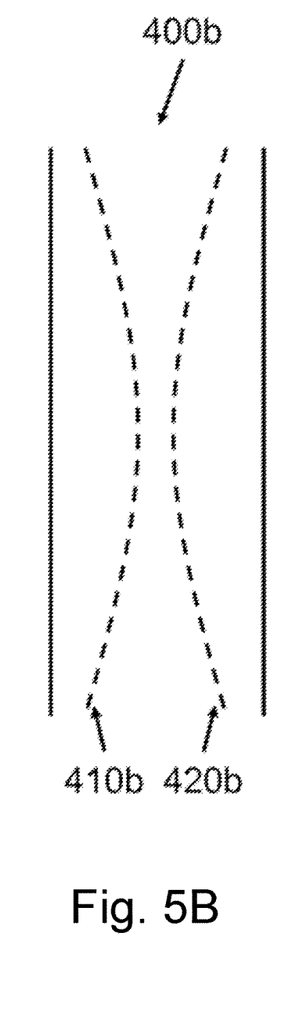
Figure 5C:
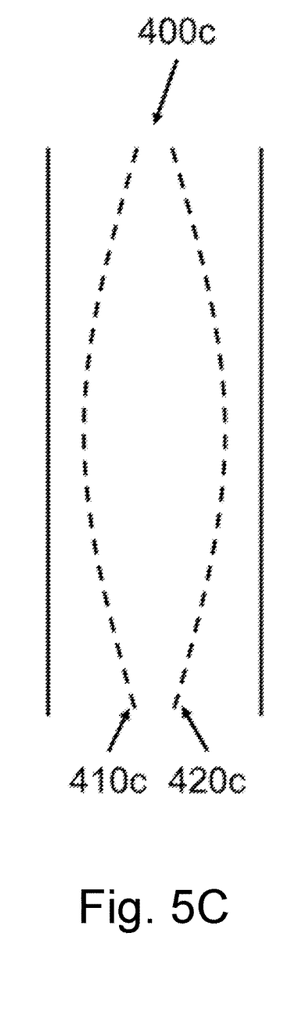

FIGS. 5A-5C are schematic drawings illustrating a partial front views of other alternative embodiments of spokes 400*a-c* for non-pneumatic tires. In FIG. 5A, the spoke 400*a* includes a first layer of reinforcement cords 410*a* and a second layer of reinforcement cords 420*a*. Each of the layers of reinforcement cords 410*a*, 420*a* has multiple curves along the length of the spoke 400*a*, and may thus be described as wavy. In the illustrated embodiment, the layers of reinforcement cords 410*a*, 420*a* are curved in opposite directions, such that the peaks of the first layer of reinforcement cords 410*a* correspond with the peaks of the second layer of reinforcement cords 420*a*. In alternative embodiments (not shown), the curves of the layers of reinforcement cords may be offset, or the layers of reinforcement cords may be curved such that they have waves of differing periodicity.

In FIG. 5B, the spoke 400*b* includes a first layer of reinforcement cords 410*b* and a second layer of reinforcement cords 420*b*. Each of the layers of reinforcement cords 410*b*, 420*b* has a single curve along the length of the spoke 400*ab*. In the illustrated embodiment, the layers of reinforcement cords 410*b*, 420*b* are curved in opposite directions such that they form a biconcave shape. In an alternative embodiment (not shown) the layer of reinforcement cords may be curved in the same direction or have offset curves.

In FIG. 5C, the spoke 400*c* includes a first layer of reinforcement cords 410*c* and a second layer of reinforcement cords 420*c*. Each of the layers of reinforcement cords 410*c*, 420*c* has a single curve along the length of the spoke 400*c*. In the illustrated embodiment, the layers of reinforcement cords 410*c*, 420*c* are curved in opposite directions such that they form a biconvex shape, or an ogive shape. In an alternative embodiment (not shown) the layers of reinforcement cords may be curved in the same direction or have offset curves.

Figure 6:
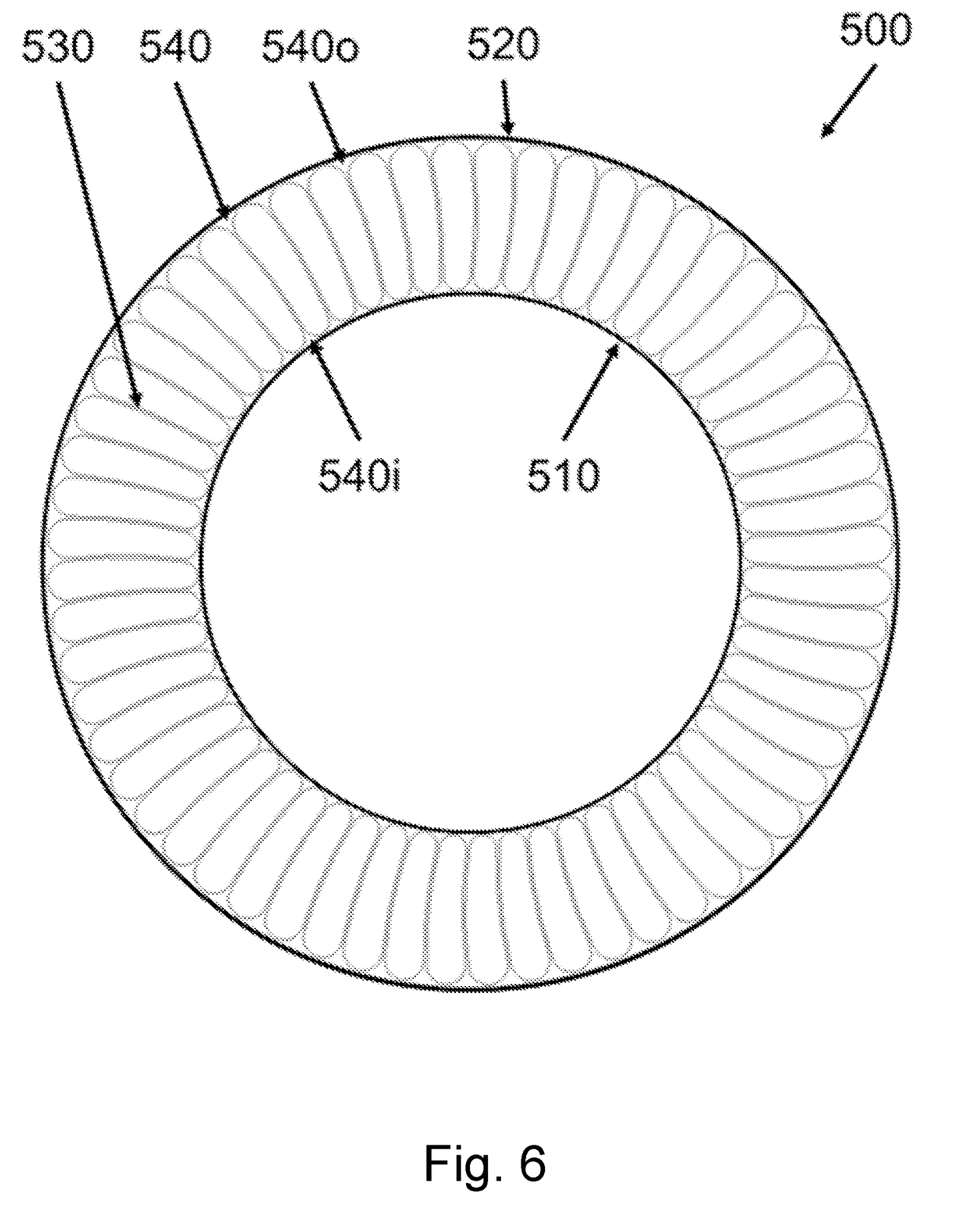
FIG. 6 is a front view of yet another alternative embodiment of a non-pneumatic tire.

In alternative embodiments, the spokes themselves may be curved. For example, FIG. 6 is a front view of yet another alternative embodiment of a non-pneumatic tire 500. The non-pneumatic tire 500 includes an inner ring 510 having a first diameter, and an outer ring 520 having a second diameter greater than the first diameter. The outer ring 520 is substantially coaxial with the inner ring 510. A plurality of spokes 530 extend between the inner ring 510 and the outer ring 520. In an alternative embodiment, a webbing or other support structure may be employed instead of spokes. A circumferential tread (not shown in this figure) may be disposed about the outer ring 520. The non-pneumatic tire 500 is substantially the same as the non-pneumatic tire 100 except for the differences described herein. Like materials may be used for like components.

The spokes 530 are formed by a plurality of U-shaped components disposed circumferentially about the non-pneumatic tire 500. Each individual U-shaped component extends laterally from a first side of the non-pneumatic tire 500 to second side of the non-pneumatic tire 500. Each of the plurality of U-shaped components defines an opening that is visible from the first side of the tire. In this embodiment, the U-shaped components are curved, and thus form curved spokes 530. In alternative embodiments (not shown), the U-shaped components may have other curvatures.

In the illustrated embodiment, each of the plurality of U-shaped components is in direct contact with both the inner ring 510 and the outer ring 520. A plurality of fillets 540 are also disposed between the inner ring 510 and the outer ring 520. The plurality of fillets 540 includes inner fillets 540*i* and outer fillets 540*o*. The inner fillets 540*i* are in direct contact with the inner ring 510, and both a first U-shaped component and a second U-shaped component in each adjacent pair of U-shaped components. The outer fillets 540*o* are in direct contact with the outer ring 520, and both the first U-shaped component and second U-shaped component in each adjacent pair of U-shaped components.

Figure 7:
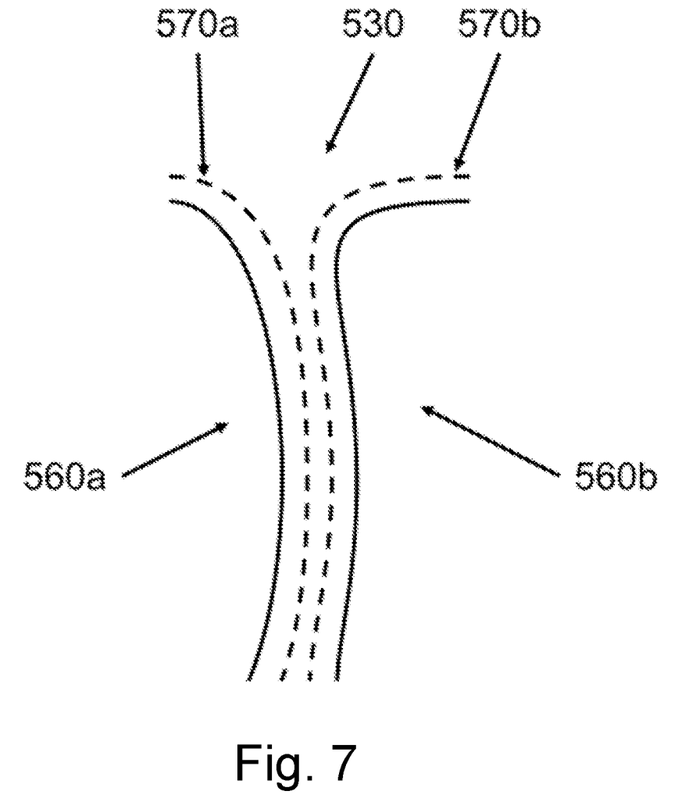
FIG. 7 is a schematic drawing illustrating a partial front view of a spoke of the non-pneumatic tire of FIG. 6.

FIG. 7 is a schematic drawing illustrating a partial front view of a spoke 530 of the non-pneumatic tire 500 of FIG. 6. As shown in this figure, the spoke 530 is formed by a first U-shaped component 560*a* and a second U-shaped component 560*b*. The first U-shaped component includes a first layer of reinforcement cords 570*a*. The second U-shaped component includes a second layer of reinforcement cords 570*b*. Each of the U-shaped components has a pair of curved extents that extend between the inner ring and the outer ring and that are in contact with the curved extents of adjacent U-shaped components, thereby forming the spokes 530. In the illustrated embodiment, the curved extents of each U-shaped component are substantially parallel to each other. In an alternative embodiment (not shown), each pair of the adjacent curved extents are curved in opposite directions.

In one embodiment, at least half of the curved extent of the first U-shaped component 560*a* is in contact with at least half of the curved extent of the second U-shaped component 560*b*. In an alternative embodiment, at least two-thirds of the curved extent of the first U-shaped component 560*a* is in contact with at least two-thirds of the curved extent of the second U-shaped component 560*b*.

In the illustrated embodiment, the first and second layers of reinforcement cords 570*a,b* are curved in the same manner as the extents of the U-shaped components 560*a,b*. In an alternative embodiment (not shown), one or more of the layers of reinforcement cords may be straight. In other alternative embodiments (not shown), the layers of reinforcement cords may be curved in different manners, similar to the curves shown in FIGS. 4 and 5A-C.

Figure 8:
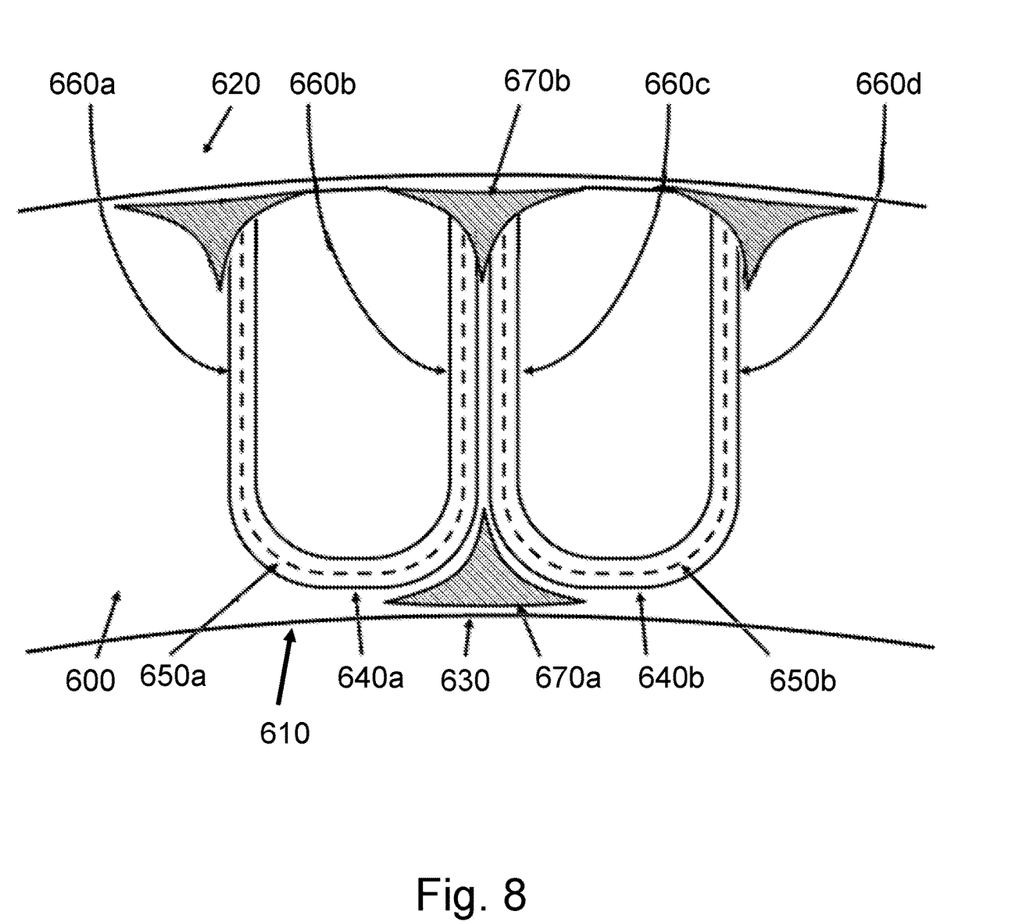
FIG. 8 is a schematic drawing illustrating a partial front view of still another alternative embodiment of a non-pneumatic tire during its construction.

FIG. 8 is a schematic drawing illustrating a partial front view of yet another alternative embodiment of a non-pneumatic tire 600 during its construction. The non-pneumatic tire 600 is substantially the same as the non-pneumatic tire 200 (including the alternatives discussed above), except for the differences discussed herein.

The non-pneumatic tire 600 includes an inner ring 610 having a first diameter, and an outer ring 620 having a second diameter greater than the first diameter. The outer ring 620 is substantially coaxial with the inner ring 610. As shown in this figure, a spoke 630 is being formed by a first U-shaped component 640*a* and a second U-shaped component 640*b*. The first U-shaped component includes a first layer of reinforcement cords 650*a* and the second U-shaped component includes a second layer of reinforcement cords 650*b*.

In the illustrated embodiment, each U-shaped component has a base adjacent to the inner ring 610 and a pair of substantially radial extents that extend towards the outer ring 620. Specifically, the first U-shaped component has a first substantially radial extent 660a and a second substantially radial extent 660b extending towards the outer ring 620. The second U-shaped component has a third substantially radial extent 660c and a fourth substantially radial extent 660d extending towards the outer ring 620. Thus, each of the U-shaped components has a reinforcement 650 that extends circumferentially along the inner ring 610 and radially along the extents 660, terminating at a location adjacent to the outer ring 620.

Additionally, a first fillet 670a is disposed between the first U-shaped component 640a, the second U-shaped component 640b, and the inner ring 610. A second fillet 670b is likewise disposed between the first U-shaped component 640a, the second U-shaped component 640b, and the outer ring 620.

At the stage shown in FIG. 8, the first U-shaped component 640a is spaced from the second U-shaped component 640b. This spacing may be exaggerated for illustrative purposes. During the process of forming the non-pneumatic tire, heat and pressure are applied during a curing process. Specifically, pressure is applied to the second extent 660b of the first U-shaped component 640a and to the third extent 660c of the second U-shaped component 640b, which causes the second extent 660b to contact the third extent 660c. As heat and pressure are applied, the second extent 660b bonds with the third extent 660c, such that the first U-shaped component 640a and the second U-shaped component 640b form a single spoke 630 having two layers of reinforcement cords formed by the first and second layer of reinforcement cords 650a,b. The resulting spoke 630 extends in a substantially radial direction, in the same manner as the spokes 130 of FIGS. 1 and 2.

In one embodiment, at least half of the second extent 660b is in contact with at least half of the third extent 660c. In an alternative embodiment, at least two-thirds of the second extent 660b is in contact with at least two-thirds of the third extent 660c.

Figure 9:
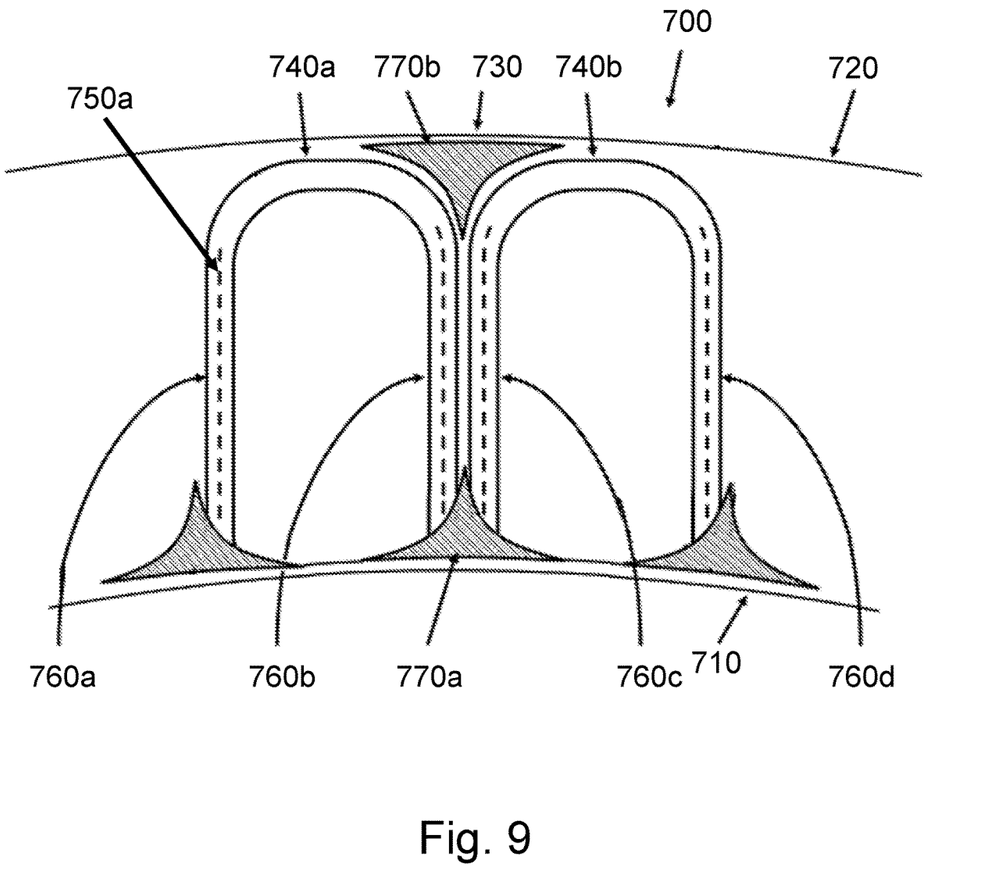
FIG. 9 is a schematic drawing illustrating a partial front view of still another alternative embodiment of a non-pneumatic tire during its construction.

FIG. 9 is a schematic drawing illustrating a partial front view of still another alternative embodiment of a non-pneumatic tire 700 during its construction. The non-pneumatic tire 700 is substantially the same as the non-pneumatic tire 200 (including the alternatives discussed above), except for the differences discussed herein.

The non-pneumatic tire 700 includes an inner ring 710 having a first diameter, and an outer ring 620 having a second diameter greater than the first diameter. The outer ring 720 is substantially coaxial with the inner ring 710. As shown in this figure, a spoke 730 is being formed by a first U-shaped component 740a and a second U-shaped component 740b.

In the illustrated embodiment, each U-shaped component has a base adjacent to the outer ring 720 and a pair of substantially radial extents that extend towards the inner ring 710, with each extent including a reinforcement layer. Specifically, the first U-shaped component 740a has a first reinforcement layer 750a embedded in a first substantially radial extent 760a and a second reinforcement layer 750b embedded in a second substantially radial extent 760b. The second U-shaped component 740b has a third reinforcement layer 750c embedded in a third substantially radial extent 760c and a fourth reinforcement layer 750d embedded in a fourth substantially radial extent 760d. In this embodiment, the bases of the U-shaped components 740 do not have a reinforcement layer. Thus, each reinforcement layer 750 terminates at a first end adjacent to the inner ring 710 and a second end adjacent to the outer ring 720.

Additionally, a first fillet 770a is disposed between the first U-shaped component 740a, the second U-shaped component 740b, and the inner ring 710. A second fillet 770b is likewise disposed between the first U-shaped component 740a, the second U-shaped component 740b, and the outer ring 720.

At the stage shown in FIG. 9, the first U-shaped component 740a is spaced from the second U-shaped component 740b. This spacing may be exaggerated for illustrative purposes. During the process of forming the non-pneumatic tire, heat and pressure are applied during a curing process. Specifically, pressure is applied to the second extent 760b of the first U-shaped component 740a and to the third extent 760c of the second U-shaped component 740b, which causes the second extent 760b to contact the third extent 760c. As heat and pressure are applied, the second extent 760b bonds with the third extent 760c, such that the first U-shaped component 740a and the second U-shaped component 740b form a single spoke 730 having two layers of reinforcement cords formed by the first and second layer of reinforcement cords 750a,b. The resulting spoke 730 extends in a substantially radial direction, in the same manner as the spokes 130 of FIGS. 1 and 2.

In one embodiment, at least half of the second extent 760b is in contact with at least half of the third extent 760c. In an alternative embodiment, at least two-thirds of the second extent 760b is in contact with at least two-thirds of the third extent 760c.

In an alternative embodiment (not shown), the U-shaped components may be oriented in an opposite direction than what is shown in FIG. 9. In other words, the U-shaped components may have the same orientation shown in FIG. 8. It should be understood, however, that in alternative embodiments, some U-shaped components may be oriented with a base adjacent to an inner ring while other U-shaped components are oriented with a base adjacent to an outer ring. For example, in one embodiment, the orientation of each U-shaped component may alternate. In another embodiment, a first pair of adjacent U-shaped components are oriented in a first radial direction, and the next pair of adjacent U-shaped components are oriented in a second radial direction opposite the first radial direction. In other embodiments, the orientation of the U-shaped components may follow other patterns or could be random.

Figure 10:
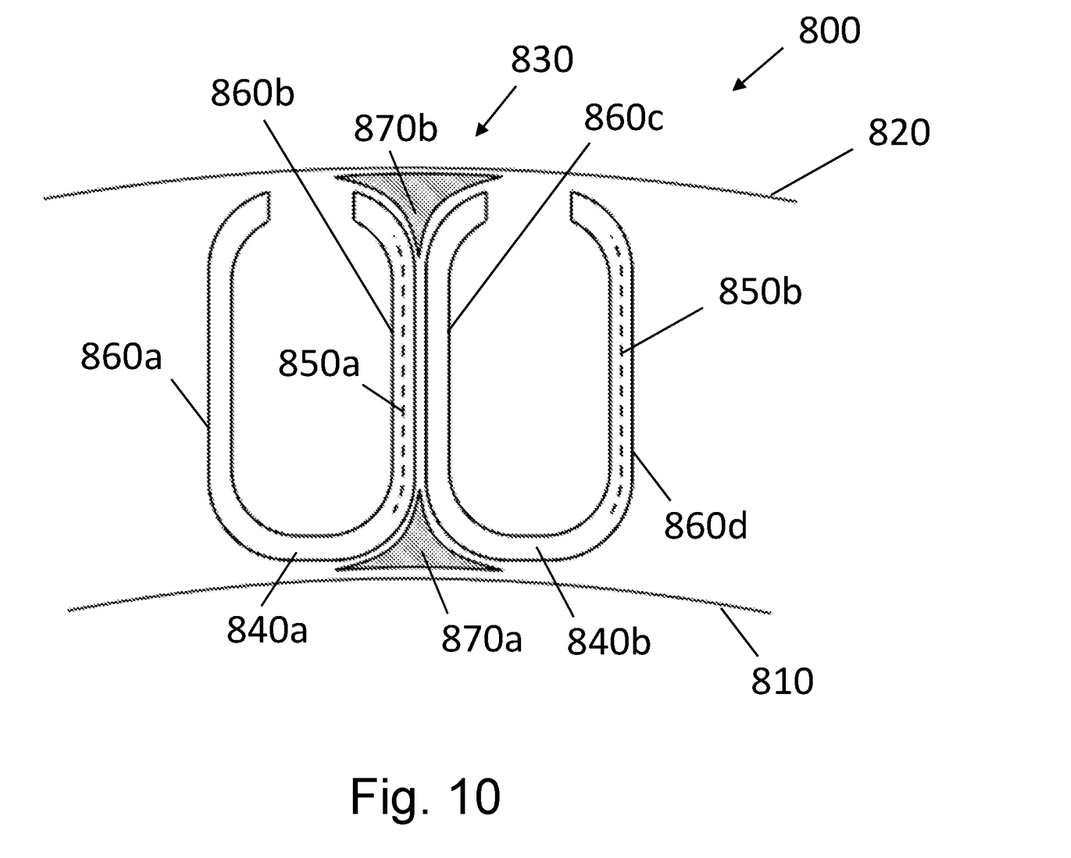
FIG. 10 is a schematic drawing illustrating a partial front view of yet another alternative embodiment of a non-pneumatic tire during its construction.

FIG. 10 is a schematic drawing illustrating a partial front view of yet another alternative embodiment of a non-pneumatic tire 800 during its construction. The non-pneumatic tire 800 is substantially the same as the non-pneumatic tires 200, 600 (including the alternatives discussed above), except for the differences discussed herein.

The non-pneumatic tire 800 includes an inner ring 810 having a first diameter, and an outer ring 820 having a second diameter greater than the first diameter. The outer ring 820 is substantially coaxial with the inner ring 810. As shown in this figure, a spoke 830 is being formed by a first U-shaped component 840a and a second U-shaped component 840b. The first U-shaped component includes a first layer of reinforcement cords 850a that extends through only a part of the component. The second U-shaped component likewise includes a second layer of reinforcement cords 850b that extends through only a part of the component.

In the illustrated embodiment, each U-shaped component has a base adjacent to the inner ring 810 and a pair of substantially radial extents that extend towards the outer ring 820. Specifically, the first U-shaped component has a first substantially radial extent 860a and a second substantially radial extent 860b extending towards the outer ring 820. In this embodiment, only the second substantially radial extent 860b includes the first layer of reinforcement cords 850a. In an alternative embodiment, only the first substantially radial extent includes the first layer of reinforcement cords.

The second U-shaped component has a third substantially radial extent 860c and a fourth substantially radial extent 860d extending towards the outer ring 820. In this embodiment, only the fourth substantially radial extent 860d includes a second layer of reinforcement cords 850b. In an alternative embodiment, only the third substantially radial extent includes the second layer of reinforcement cords.

As can be seen in the illustrated embodiment, each of the U-shaped components has a reinforcement 850 that extends only radially along a single extent. Thus, each spoke 830 has a single layer of reinforcement.

Additionally, a first fillet 870a is disposed between the first U-shaped component 840a, the second U-shaped component 840b, and the inner ring 810. A second fillet 870b is likewise disposed between the first U-shaped component 840a, the second U-shaped component 840b, and the outer ring 820.

At the stage shown in FIG. 10, the first U-shaped component 840a is spaced from the second U-shaped component 840b. This spacing may be exaggerated for illustrative purposes. During the process of forming the non-pneumatic tire, heat and pressure are applied during a curing process. Specifically, pressure is applied to the second extent 860b of the first U-shaped component 840a and to the third extent 860c of the second U-shaped component 840b, which causes the second extent 860b to contact the third extent 860c. As heat and pressure are applied, the second extent 860b bonds with the third extent 860c, such that the first U-shaped component 840a and the second U-shaped component 840b form a single spoke 830 having a single layer of reinforcement cords formed by the first layer of reinforcement cords 850a. The resulting spoke 830 extends in a substantially radial direction, in the same manner as the spokes 130 of FIGS. 1 and 2.

In one embodiment, at least half of the second extent 860b is in contact with at least half of the third extent 860c. In an alternative embodiment, at least two-thirds of the second extent 860b is in contact with at least two-thirds of the third extent 860c.

In FIGS. 2, 8, and 10 both of the U-shaped components are oriented in the same radial direction. It should be understood, however, that in alternative embodiments, some U-shaped components may be oriented with a base adjacent to an inner ring while other U-shaped components are oriented with a base adjacent to an outer ring. For example, in one embodiment, the orientation of each U-shaped component may alternate. In another embodiment, a first pair of adjacent U-shaped components are oriented in a first radial direction, and the next pair of adjacent U-shaped components are oriented in a second radial direction opposite the first radial direction. FIGS. 2, 8, and 10 may represent different portions of the same tire of such an embodiment. In other embodiments, the orientation of the U-shaped components may follow other patterns or could be random.

Figure 11:
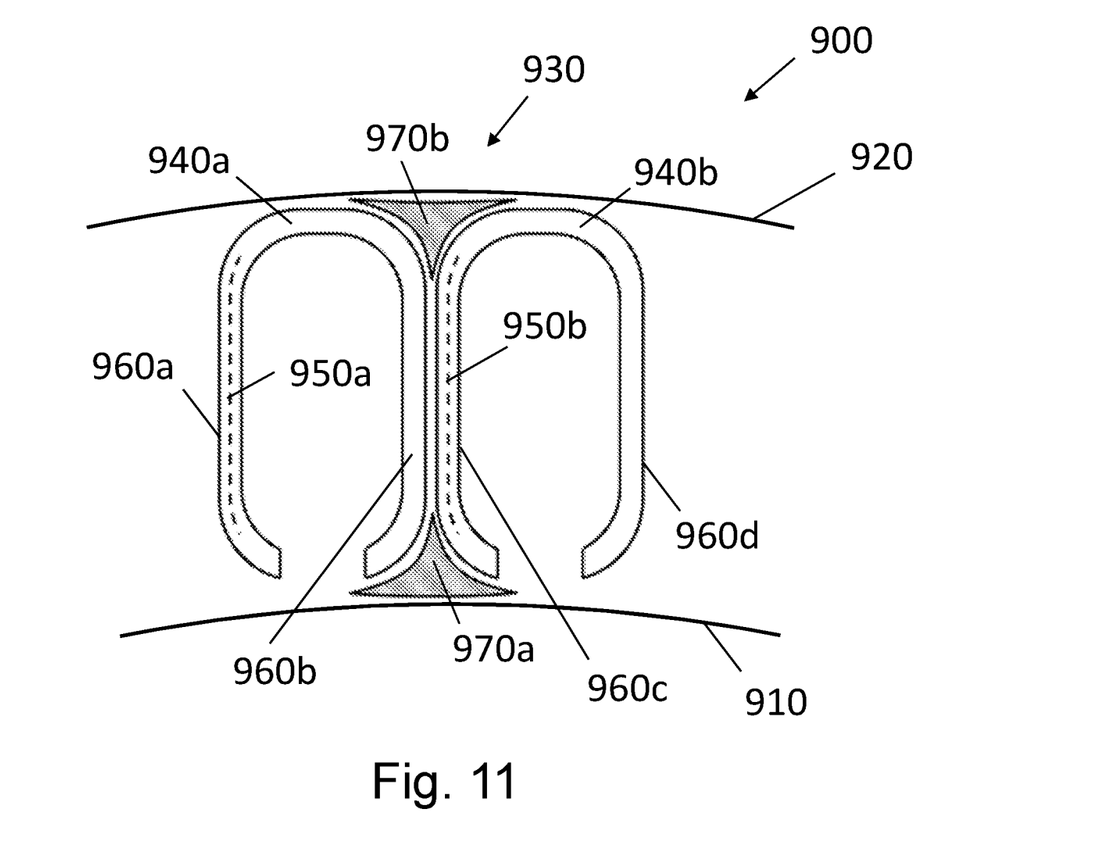
FIG. 11 is a schematic drawing illustrating a partial front view of still another alternative embodiment of a non-pneumatic tire during its construction.

FIG. 11 is a schematic drawing illustrating a partial front view of still another alternative embodiment of a non-pneumatic tire 900 during its construction. The non-pneumatic tire 900 is substantially the same as the non-pneumatic tires 200 and 700 (including the alternatives discussed above), except for the differences discussed herein.

The non-pneumatic tire 900 includes an inner ring 910 having a first diameter, and an outer ring 920 having a second diameter greater than the first diameter. The outer ring 920 is substantially coaxial with the inner ring 910. As shown in this figure, a spoke 930 is being formed by a first U-shaped component 940a and a second U-shaped component 940b.

In the illustrated embodiment, each U-shaped component has a base adjacent to the outer ring 920 and a pair of substantially radial extents that extend towards the inner ring 910, with each extent including a reinforcement layer that extends through only a portion of the component. Specifically, the first U-shaped component 940a has a first reinforcement layer 950a embedded in only a first substantially radial extent 960a. A second substantially radial extent 960b does not include a reinforcement layer. In an alternative embodiment, the first U-shaped component has a first reinforcement layer embedded in only a second substantially radial extent.

The second U-shaped component 940b has a second reinforcement layer 950b embedded in only a third substantially radial extent 960c. A fourth substantially radial extent 960d does not include a reinforcement layer. In an alternative embodiment, the second U-shaped component has a second reinforcement layer embedded in only a fourth substantially radial extent.

In the illustrated embodiment, the bases of the U-shaped components 940 do not have a reinforcement layer. Thus, each reinforcement layer 950 extends only radially, and each spoke 930 has only a single reinforcement layer.

A first fillet 970a is disposed between the first U-shaped component 940a, the second U-shaped component 940b, and the inner ring 910. A second fillet 970b is likewise disposed between the first U-shaped component 940a, the second U-shaped component 940b, and the outer ring 920.

At the stage shown in FIG. 11, the first U-shaped component 940a is spaced from the second U-shaped component 940b. This spacing may be exaggerated for illustrative purposes. During the process of forming the non-pneumatic tire, heat and pressure are applied during a curing process. Specifically, pressure is applied to the second extent 960b of the first U-shaped component 940a and to the third extent 960c of the second U-shaped component 940b, which causes the second extent 960b to contact the third extent 960c. As heat and pressure are applied, the second extent 960b bonds with the third extent 960c, such that the first U-shaped component 940a and the second U-shaped component 940b form a single spoke 930 having a single layer of reinforcement cords formed by the first layer of reinforcement cords 950a. The resulting spoke 930 extends in a substantially radial direction, in the same manner as the spokes 130 of FIGS. 1 and 2.

In one embodiment, at least half of the second extent 960b is in contact with at least half of the third extent 960c. In an alternative embodiment, at least two-thirds of the second extent 960b is in contact with at least two-thirds of the third extent 960c.

To build a non-pneumatic tire, such as the non-pneumatic tire 100, 200, 300, 500, 600, 700, 800, 900 an operator may perform the steps of providing an inner ring of elastomeric material, providing an outer ring of elastomeric material, and arranging the inner ring and the outer ring such that the inner ring is substantially coaxial with the outer ring. In one embodiment, the operator provides sheets of reinforced elastomeric material, and forms a plurality of U-shaped components with the sheets of reinforced elastomeric material. The operator then places the U-shaped components of reinforced elastomeric material between the inner ring and the outer ring.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
   an inner ring having a first diameter;
   an outer ring having a second diameter greater than the first diameter, the outer ring being substantially coaxial with the inner ring;
   support structure extending between the inner ring and the outer ring, the support structure including a plurality of U-shaped components extending laterally from a first side of the non-pneumatic tire to a second side of the non-pneumatic tire,
   wherein each of the plurality of U-shaped components defines an opening that is visible from the first side of the non-pneumatic tire,
   wherein each of the plurality of U-shaped components is in direct contact with both the inner ring and the outer ring,
   wherein the plurality of U-shaped components includes at least a first U-shaped component and a second U-shaped component, the first U-shaped component being in direct contact with the second U-shaped component; and
   a plurality of fillets disposed between the inner ring and the outer ring, the plurality of fillets including at least a first fillet and a second fillet,
   wherein the first fillet is in direct contact with the inner ring, the first U-shaped component, and the second U-shaped component, and
   wherein the second fillet is in direct contact with the outer ring, the first U-shaped component, and the second U-shaped component.

2. The non-pneumatic tire of claim 1, wherein the first U-shaped component includes a first extent and a second extent extending between the inner ring and the outer ring, wherein the second U-shaped component includes a third extent and a fourth extent extending between the inner ring and the outer ring, and wherein the second extent contacts the third extent.

3. The non-pneumatic tire of claim 2, wherein each of the first extent, the second extent, the third extent, and the fourth extent are curved.

4. The non-pneumatic tire of claim 2, wherein the first extent is a first substantially radial extent that includes a first reinforcement layer extending in a substantially radial direction, and wherein the second extent is a second substantially radial extent that includes a second reinforcement layer that is curved with respect to the radial direction.

5. The non-pneumatic tire of claim 1, wherein each of the plurality of U-shaped components is formed by a sheet of elastomeric material having a single layer of reinforcement disposed therein.

6. The non-pneumatic tire of claim 5, wherein the single layer of reinforcement of one of the plurality of U-shaped components extends circumferentially along the outer ring and radially along each of a pair of extents of the U-shaped component, terminating at a location adjacent to the inner ring.

7. The non-pneumatic tire of claim 5, wherein the single layer of reinforcement of one of the plurality of U-shaped components extends circumferentially along the inner ring and radially along each of a pair of extents of the U-shaped component, terminating at a location adjacent to the outer ring.

8. The non-pneumatic tire of claim 1, wherein one of the plurality of U-shaped components includes a first layer of reinforcement in a first extent and a second layer of reinforcement in a second extent, wherein a base of the U-shaped component does not include a layer of reinforcement.

9. A non-pneumatic tire comprising:
   an inner ring;
   an outer ring;
   a plurality of U-shaped components extending between the inner ring and the outer ring, the plurality of U-shaped components including at least a first U-shaped component and a second U-shaped component,
   wherein the first U-shaped component is in direct contact with both the inner ring and the outer ring,
   wherein the first U-shaped component has a single reinforcement layer disposed therein,
   wherein the first U-shaped component includes a first extent that extends between the inner ring and the outer ring and a second extent that extends between the inner ring and the outer ring,
   wherein the second U-shaped component is in direct contact with both the inner ring and the outer ring,
   wherein the second U-shaped component has a single reinforcement layer disposed therein,
   wherein the second U-shaped component includes a third extent that extends between the inner ring and the outer ring and a fourth extent that extends between the inner ring and the outer ring, and
   wherein the second extent is in direct contact with the third extent.

10. The non-pneumatic tire of claim 9, further comprising a plurality of fillets disposed between the inner ring and the outer ring,
    wherein the plurality of fillets includes at least a first fillet in contact with the inner ring, the first U-shaped component, and the second U-shaped component, and wherein the plurality of fillets includes at least a second fillet in contact with the outer ring, the first U-shaped component, and the second U-shaped component.

11. The non-pneumatic tire of claim 9, wherein each of the first extent, the second extent, the third extent, and the fourth extent extends substantially linearly in a radial direction.

12. The non-pneumatic tire of claim 9, wherein the first extent is curved in a first direction and the second extent is curved in a second direction, and wherein the first direction is substantially parallel to the second direction.

13. The non-pneumatic tire of claim 12, wherein the single reinforcement layer of the first U-shaped component in the first extent is curved in the first direction and the single reinforcement layer of the first U-shaped component in the second extent is curved in the second direction substantially parallel the first direction.

* * * * *